(12) United States Patent
Park et al.

(10) Patent No.: US 12,160,583 B2
(45) Date of Patent: *Dec. 3, 2024

(54) INTER-PREDICTION METHOD AND APPARATUS IN IMAGE CODING SYSTEM

(71) Applicant: LG Electronics Inc., Seoul (KR)

(72) Inventors: Naeri Park, Seoul (KR); Junghak Nam, Seoul (KR); Jaehyun Lim, Seoul (KR); Seunghwan Kim, Seoul (KR); Jungdong Seo, Seoul (KR); Jaeho Lee, Seoul (KR); Hyeongmoon Jang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/368,336

(22) Filed: Sep. 14, 2023

(65) Prior Publication Data

US 2024/0007646 A1 Jan. 4, 2024

Related U.S. Application Data

(63) Continuation of application No. 17/843,531, filed on Jun. 17, 2022, now Pat. No. 11,800,114, which is a continuation of application No. 16/476,003, filed as application No. PCT/KR2017/004371 on Apr. 25, 2017, now Pat. No. 11,394,976.

(60) Provisional application No. 62/441,585, filed on Jan. 3, 2017.

(51) Int. Cl.
*H04N 19/139* (2014.01)
*H04N 19/105* (2014.01)
*H04N 19/109* (2014.01)
*H04N 19/176* (2014.01)
*H04N 19/503* (2014.01)

(52) U.S. Cl.
CPC ......... *H04N 19/139* (2014.11); *H04N 19/105* (2014.11); *H04N 19/109* (2014.11); *H04N 19/176* (2014.11); *H04N 19/503* (2014.11)

(58) Field of Classification Search
None
See application file for complete search history.

(56) References Cited

U.S. PATENT DOCUMENTS

| | | | |
|---|---|---|---|
| 8,995,529 B2* | 3/2015 | Lee | H04N 19/139 375/240.12 |
| 2015/0208093 A1* | 7/2015 | Lee | H04N 19/136 375/240.16 |
| 2018/0084260 A1* | 3/2018 | Chien | H04N 19/52 |

* cited by examiner

*Primary Examiner* — James M Anderson, II

(57) ABSTRACT

An image decoding method performed by a decoding apparatus includes the operations: deriving a correspondence block corresponding to the current block of the current picture, the correspondence block being located in a co-located picture; deriving a movement vector of the correspondence block; scaling the movement vector of the correspondence block based on a first temporal distance and second temporal distance, the first temporal distance being the difference between the POC values of the co-located picture and POC values of the reference picture of the correspondence block, and the second temporal distance being the difference between the POC values of the co-located picture and POC values of the current picture containing the current block; deriving the movement vector updated based on the scaled movement vector and location of the current block; and deriving a movement vector of the current block based on the updated movement vector.

3 Claims, 10 Drawing Sheets

INTER-PREDICTION METHOD AND APPARATUS IN IMAGE CODING SYSTEM

CROSS-REFERENCE TO RELATED APPLICATIONS

This application is a continuation of U.S. application Ser. No. 17/843,531, filed on Jun. 17, 2022, which is a continuation of U.S. application Ser. No. 16/476,003, filed on Jul. 3, 2019, now U.S. Pat. No. 11,394,976, which is a National Stage application under 35 U.S.C. § 371 of International Application No. PCT/KR2017/004371, filed on Apr. 25, 2017, which claims the benefit of U.S. Provisional Application No. 62/441,585, filed on Jan. 3, 2017. The disclosures of the prior applications are incorporated by reference in their entirety.

BACKGROUND

Field of the Invention

The present invention relates to an image coding technology, and more particularly, to an image decoding method and apparatus in an image coding system.

Related Art

Demand for high-resolution, high-quality images such as HD (High Definition) images and UHD (Ultra High Definition) images has been increasing in various fields. As the image data has high resolution and high quality, the amount of information or bits to be transmitted increases relative to the legacy image data. Therefore, when image data is transmitted using a medium such as a conventional wired/wireless broadband line or image data is stored using an existing storage medium, the transmission cost and the storage cost thereof are increased.

Accordingly, there is a need for a highly efficient image compression technique for effectively transmitting, storing, and reproducing information of high resolution and high quality images.

SUMMARY

It is an object of the present invention to provide a method and apparatus for enhancing inter-prediction efficiency.

It is another object of the present invention to provide a method and apparatus for updating a corresponding block of a current block.

It is further another object of the present invention to provide a method and apparatus for deriving a motion vector of a current block based on a motion vector of an updated corresponding block of a current block.

It is further another object of the present invention to provide a method and apparatus for constructing a merge candidate list or an MVP candidate list of a current block based on a motion vector of an updated corresponding block of a current block.

In an aspect, a video decoding method performed by a video decoding apparatus is provided. The method includes: deriving a corresponding block corresponding to a current block in current picture, wherein the corresponding block is located in a collocated picture; deriving a motion vector of the corresponding block; scaling the motion vector of the corresponding block based on a first temporal distance and a second temporal distance, wherein the first temporal distance is a difference between a picture order count (POC) value of the collocated picture and a POC value of a reference picture of the corresponding block, the second temporal distance is a difference between the POC value of the collocated picture and a POC value of a current picture including the current block; deriving a modified motion vector based on the scaled motion vector and a position of the current block; and deriving a motion vector of the current block based on the modified motion vector.

In another aspect, a decoding apparatus for decoding a video is provided. The decoding apparatus includes: an entropy decoding unit configured to receive information indicating a prediction mode of a current block of a current picture; and a prediction unit configured to derive a corresponding block corresponding to the current block, derive a motion vector of the corresponding block, scale a motion vector of the corresponding block based on a first temporal distance and a second temporal distance, derive a modified motion vector based on the scaled motion vector and a position of the current block, and derive a motion vector of the current block based on the modified motion vector, wherein the corresponding block is positioned within a collocated picture, wherein the first temporal distance is a difference between a picture order count (POC) value of the collocated picture and a POC value of a reference picture of the corresponding block, and wherein the second temporal distance is a difference between the POC value of the collocated picture and a POC value of the current picture including the current block.

In further another aspect, a video encoding method performed by a video encoding apparatus is provided. The method includes: deriving a corresponding block corresponding to a current block in current picture, wherein the corresponding block is located in a collocated picture; deriving a motion vector of the corresponding block; scaling the motion vector of the corresponding block based on a first temporal distance and a second temporal distance, wherein the first temporal distance is a difference between a picture order count (POC) value of the collocated picture and a POC value of a reference picture of the corresponding block, the second temporal distance is a difference between the POC value of the collocated picture and a POC value of a current picture including the current block; deriving a modified motion vector based on the scaled motion vector and a position of the current block; and deriving a motion vector of the current block based on the modified motion vector.

In further another aspect, an encoding apparatus for encoding a video is provided. The encoding apparatus includes: an entropy encoding unit configured to receive information indicating a prediction mode of a current block of a current picture; and a prediction unit configured to derive a corresponding block corresponding to the current block, derive a motion vector of the corresponding block, scale a motion vector of the corresponding block based on a first temporal distance and a second temporal distance, derive a modified motion vector based on the scaled motion vector and a position of the current block, and derive a motion vector of the current block based on the modified motion vector, wherein the corresponding block is positioned within a collocated picture, wherein the first temporal distance is a difference between a picture order count (POC) value of the collocated picture and a POC value of a reference picture of the corresponding block, and wherein the second temporal distance is a difference between the POC value of the collocated picture and a POC value of the current picture including the current block.

According to the present invention, the motion information of the current block can be more accurately derived, thereby reducing or eliminating the amount of data for motion information of the current block and improving the overall coding efficiency.

In addition, according to the present invention, it is possible to update the corresponding block of the current block in the inter prediction of the current block, more accurately derive the motion information of the current block based on the updated motion information, through which the prediction accuracy of the current block can be improved.

DESCRIPTION OF EXEMPLARY EMBODIMENTS

Figure 1:
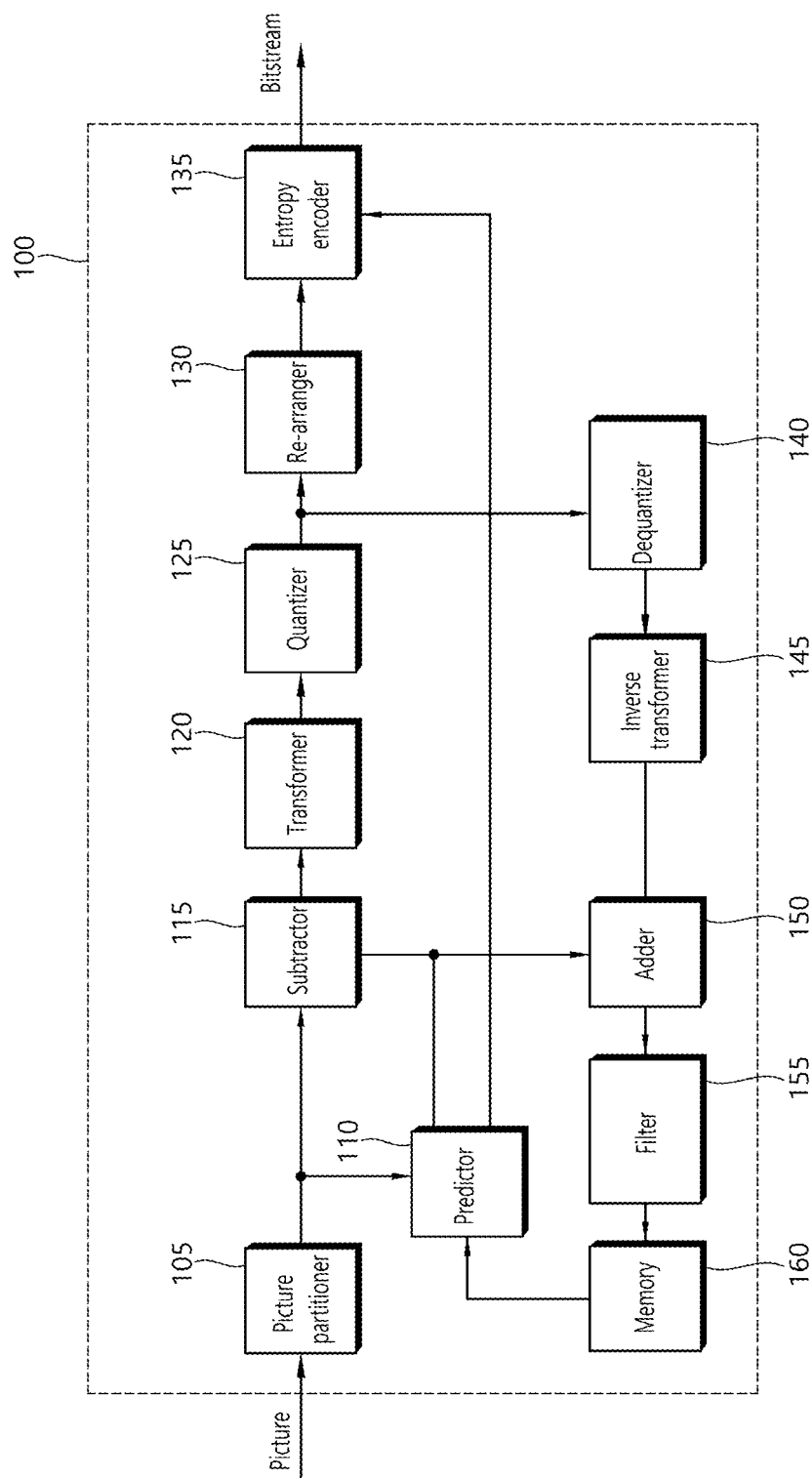
FIG. 1 is a schematic diagram illustrating a configuration of a video encoding apparatus to which the present invention is applicable.

The present invention may be modified in various forms, and specific embodiments thereof will be described and illustrated in the drawings. However, the embodiments are not intended for limiting the invention. The terms used in the following description are used to merely describe specific embodiments, but are not intended to limit the invention. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

On the other hand, elements in the drawings described in the invention are independently drawn for the purpose of convenience for explanation of different specific functions, and do not mean that the elements are embodied by independent hardware or independent software. For example, two or more elements of the elements may be combined to form a single element, or one element may be divided into plural elements. The embodiments in which the elements are combined and/or divided belong to the invention without departing from the concept of the invention.

Hereinafter, embodiments of the present invention will be described in detail with reference to the accompanying drawings. In addition, like reference numerals are used to indicate like elements throughout the drawings, and the same descriptions on the like elements will be omitted.

In the present specification, generally a picture means a unit representing an image at a specific time, a slice is a unit constituting a part of the picture. One picture may be composed of plural slices, and the terms of a picture and a slice may be mixed with each other as occasion demands.

A pixel or a pel may mean a minimum unit constituting one picture (or image). Further, a 'sample' may be used as a term corresponding to a pixel. The sample may generally represent a pixel or a value of a pixel, may represent only a pixel (a pixel value) of a luma component, and may represent only a pixel (a pixel value) of a chroma component.

A unit indicates a basic unit of image processing. The unit may include at least one of a specific area and information related to the area. Optionally, the unit may be mixed with terms such as a block, an area, or the like. In a typical case, an M×N block may represent a set of samples or transform coefficients arranged in M columns and N rows.

FIG. 1 briefly illustrates a structure of a video encoding apparatus to which the present invention is applicable.

Referring to FIG. 1, a video encoding apparatus 100 includes a picture partitioner 105, a predictor 110, a subtractor 115, a transformer 120, a quantizer 125, a re-arranger 130, an entropy encoder 135, a dequantizer 140, an inverse transformer 145, an adder 150, a filter 255, and a memory 160.

The picture partitioner 105 may split an input picture into at least one processing unit. Here, a processing unit may be a coding unit (CU), a prediction unit (PU) or a transform unit (TU). The coding unit is a unit block of coding, and a coding tree unit (CTU) or a largest coding unit (LCU) may be split into coding units of deeper depth according to a quad-tree structure. In this case, the largest coding unit may be used as a final coding unit or a coding unit may be recursively split into coding units of deeper depth as necessary and a coding unit having an optimal size may be used as a final coding unit on the basis of coding efficiency according to video characteristics. When a smallest coding unit (SCU) is set, a coding unit cannot be split into a coding unit smaller than the smallest coding unit.

Here, the final coding unit refers to a coding unit partitioned or split into a prediction unit or a transform unit. A prediction unit is a block partitioned from a coding unit block and may be a unit block of sample prediction. Here, the prediction unit may be divided into sub blocks. A transform block can be split from a coding unit block according to the quad-tree structure and may be a unit block that derives a transform coefficient and/or a unit block that derives a residual signal from a transform coefficient.

Hereinafter, the coding unit may be called a coding block (CB), the prediction unit may be called a prediction block (PB), and the transform unit may be called a transform block (TB).

The prediction block or the prediction unit may mean a specific area having a block shape in a picture, and may include an array of a prediction sample. Further, the transform block or the transform unit may mean a specific area having a block shape in a picture, and may include a transform coefficient or an array of a residual sample.

The predictor 110 may perform prediction on a processing target block (hereinafter, a current block), and may generate a prediction block including prediction samples for the current block. A unit of prediction performed in the predictor 110 may be a coding block, or may be a transform block, or may be a prediction block.

The predictor 110 may determine whether intra-prediction is applied or inter-prediction is applied to the current block. For example, the predictor 110 may determine whether the intra-prediction or the inter-prediction is applied in unit of CU.

In case of the intra-prediction, the predictor 110 may derive a prediction sample for the current block on the basis of a reference sample outside the current block in a picture to which the current block belongs (hereinafter, a current picture). In this case, the predictor 110 may derive the prediction sample on the basis of an average or interpolation of neighboring reference samples of the current block (case (i)), or may derive the prediction sample on the basis of a reference sample existing in a specific (prediction) direction as to a prediction sample among the neighboring reference samples of the current block (case (ii)). The case (i) may be called a non-directional mode or a non-angular mode, and the case (ii) may be called a directional mode or an angular mode. In the intra-prediction, prediction modes may include as an example 33 directional modes and at least two non-directional modes. The non-directional modes may include DC mode and planar mode. The predictor 110 may determine the prediction mode to be applied to the current block by using the prediction mode applied to the neighboring block.

In case of the inter-prediction, the predictor 110 may derive the prediction sample for the current block on the basis of a sample specified by a motion vector on a reference picture. The predictor 110 may derive the prediction sample for the current block by applying any one of a skip mode, a merge mode, and a motion vector prediction (MVP) mode. In case of the skip mode and the merge mode, the predictor 110 may use motion information of the neighboring block as motion information of the current block. In case of the skip mode, unlike in the merge mode, a difference (residual) between the prediction sample and an original sample is not transmitted. In case of the MVP mode, a motion vector of the neighboring block is used as a motion vector predictor and thus is used as a motion vector predictor of the current block to derive a motion vector of the current block.

In case of the inter-prediction, the neighboring block may include a spatial neighboring block existing in the current picture and a temporal neighboring block existing in the reference picture. The reference picture including the temporal neighboring block may also be called a collocated picture (colPic). Motion information may include the motion vector and a reference picture index. Information such as prediction mode information and motion information may be (entropy) encoded, and then output as a form of a bitstream.

When motion information of a temporal neighboring block is used in the skip mode and the merge mode, a highest picture in a reference picture list may be used as a reference picture. Reference pictures included in the reference picture list may be aligned on the basis of a picture order count (POC) difference between a current picture and a corresponding reference picture. A POC corresponds to a display order and can be discriminated from a coding order.

The subtractor 115 generates a residual sample which is a difference between an original sample and a prediction sample. If the skip mode is applied, the residual sample may not be generated as described above.

The transformer 120 transforms residual samples in units of a transform block to generate a transform coefficient. The transformer 120 may perform transformation on the basis of the size of a corresponding transform block and a prediction mode applied to a coding block or prediction block spatially overlapping with the transform block. For example, residual samples can be transformed using discrete sine transform (DST) if intra-prediction is applied to the coding block or the prediction block overlapping with the transform block and the transform block is a 4×4 residual array and is transformed using discrete cosine transform (DCT) in other cases.

The quantizer 125 may quantize the transform coefficients to generate a quantized transform coefficient.

The re-arranger 130 rearranges quantized transform coefficient. The re-arranger 130 may rearrange the quantized transform coefficients in the form of a block into a one-dimensional vector through a coefficient scanning method. Although the re-arranger 130 is described as a separate component, the re-arranger 130 may be a part of the quantizer 125.

The entropy encoder 135 may perform entropy-encoding on the quantized transform coefficients. The entropy encoding may include an encoding method, for example, an exponential Golomb, a context-adaptive variable length coding (CAVLC), a context-adaptive binary arithmetic coding (CABAC), or the like. The entropy encoder 135 may perform encoding together or separately on information (e.g., a syntax element value or the like) required for video reconstruction in addition to the quantized transform coefficients. The entropy-encoded information may be transmitted or stored in unit of a network abstraction layer (NAL) in a bitstream form.

The dequantizer 140 dequantizes values (transform coefficients) quantized by the quantizer 125 and the inverse transformer 145 inversely transforms values dequantized by the dequantizer 135 to generate a residual sample.

The adder 150 adds a residual sample to a prediction sample to reconstruct a picture. The residual sample may be added to the prediction sample in units of a block to generate a reconstructed block. Although the adder 150 is described as a separate component, the adder 150 may be a part of the predictor 110.

The filter 155 may apply deblocking filtering and/or a sample adaptive offset to the reconstructed picture. Artifacts at a block boundary in the reconstructed picture or distortion in quantization can be corrected through deblocking filtering and/or sample adaptive offset. Sample adaptive offset may be applied in units of a sample after deblocking filtering is completed. The filter 155 may apply an adaptive loop filter (ALF) to the reconstructed picture. The ALF may be applied to the reconstructed picture to which deblocking filtering and/or sample adaptive offset has been applied.

The memory 160 may store a reconstructed picture or information necessary for encoding/decoding. The DPB may store the reconstructed picture. Here, the reconstructed picture may be the reconstructed picture filtered by the filter 155. The stored reconstructed picture may be used as a reference picture for (inter) prediction of other pictures. For example, the memory 160 may store (reference) pictures used for inter-prediction. Here, pictures used for inter-prediction may be designated according to a reference picture set or a reference picture list.

Figure 2:
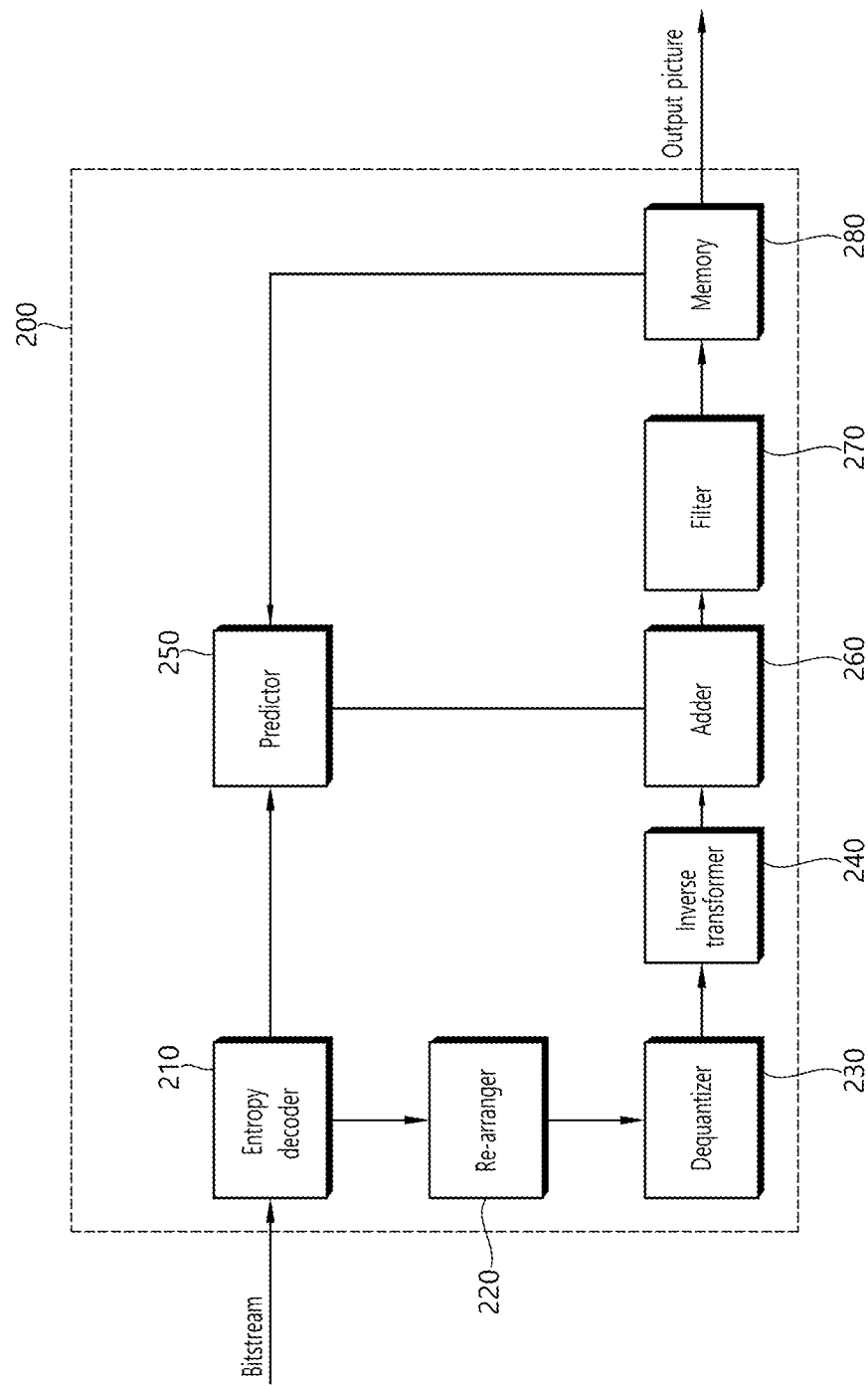
FIG. 2 is a schematic diagram illustrating a configuration of a video decoding apparatus to which the present invention is applicable.

FIG. 2 briefly illustrates a structure of a video decoding apparatus to which the present invention is applicable.

Referring to FIG. 2, a video decoding apparatus 200 includes an entropy decoder 210, a re-arranger 220, a dequantizer 230, an inverse transformer 240, a predictor 250, an adder 260, a filter 270, and a memory 280.

When a bitstream including video information is input, the video decoding apparatus 200 may reconstruct a video in association with a process by which video information is processed in the video encoding apparatus.

For example, the video decoding apparatus 200 may perform video decoding by using a processing unit applied in the video encoding apparatus. Therefore, the processing unit block of video decoding may be a coding unit block, a prediction unit block, or a transform unit block. As a unit block of decoding, the coding unit block may be split according to a quad tree structure from a largest coding unit block. As a block partitioned from the coding unit block, the prediction unit block may be a unit block of sample prediction. In this case, the prediction unit block may be divided into sub blocks. As a coding unit block, the transform unit block may be split according to the quad tree structure, and may be a unit block for deriving a transform coefficient or a unit block for deriving a residual signal from the transform coefficient.

The entropy decoder 210 may parse the bitstream to output information required for video reconstruction or picture reconstruction. For example, the entropy decoder 210 may decode information in the bitstream on the basis of a coding method such as exponential Golomb encoding, CAVLC, CABAC, or the like, and may output a value of a syntax element required for video reconstruction and a quantized value of a transform coefficient regarding a residual.

More specifically, a CABAC entropy decoding method can receive a bin corresponding to each syntax element in a bitstream, determine a context model using decoding target syntax element information and decoding information of neighboring and decoding target blocks or information of a symbol/bin decoded in a previous step, predict bin generation probability according to the determined context model and perform arithmetic decoding of the bin to generate a symbol corresponding to each syntax element value. Here, the CABAC entropy decoding method can update the context model using information of a symbol/bin decoded for a context model of the next symbol/bin after determination of the context model.

Information about prediction among information decoded in the entropy decoder 210 may be provided to the predictor 250 and residual values, that is, quantized transform coefficients, on which entropy decoding has been performed by the entropy decoder 210 may be input to the re-arranger 220.

The re-arranger 220 may rearrange the quantized transform coefficients into a two-dimensional block form. The re-arranger 220 may perform rearrangement corresponding to coefficient scanning performed by the encoding apparatus. Although the re-arranger 220 is described as a separate component, the re-arranger 220 may be a part of the quantizer 230. The dequantizer 230 may de-quantize the quantized transform coefficients on the basis of a (de)quantization parameter to output a transform coefficient. In this case, information for deriving a quantization parameter may be signaled from the encoding apparatus.

The inverse transformer 240 may inverse-transform the transform coefficients to derive residual samples.

The predictor 250 may perform prediction on a current block, and may generate prediction block including prediction samples for the current block. A unit of prediction performed in the predictor 250 may be a coding block or may be a transform block or may be a prediction block.

The predictor 250 may determine whether to apply intra-prediction or inter-prediction based on information on a prediction. In this case, a unit for determining which one will be used between the intra-prediction and the inter-prediction may be different from a unit for generating a prediction sample. In addition, a unit for generating the prediction sample may also be different in the inter-prediction and the intra-prediction. For example, which one will be applied between the inter-prediction and the intra-prediction may be determined in unit of CU. Further, for example, in the inter-prediction, the prediction sample may be generated by determining the prediction mode in unit of PU, and in the intra-prediction, the prediction sample may be generated in unit of TU by determining the prediction mode in unit of PU.

In case of the intra-prediction, the predictor 250 may derive a prediction sample for a current block on the basis of a neighboring reference sample in a current picture. The predictor 250 may derive the prediction sample for the current block by applying a directional mode or a non-directional mode on the basis of the neighboring reference sample of the current block. In this case, a prediction mode to be applied to the current block may be determined by using an intra-prediction mode of a neighboring block.

In the case of inter-prediction, the predictor 250 may derive a prediction sample for a current block on the basis of a sample specified in a reference picture according to a motion vector. The predictor 250 may derive the prediction sample for the current block using one of the skip mode, the merge mode and the MVP mode. Here, motion information required for inter-prediction of the current block provided by the video encoding apparatus, for example, a motion vector and information about a reference picture index may be acquired or derived on the basis of the information about prediction.

In the skip mode and the merge mode, motion information of a neighboring block may be used as motion information of the current block. Here, the neighboring block may include a spatial neighboring block and a temporal neighboring block.

The predictor 250 may construct a merge candidate list using motion information of available neighboring blocks and use information indicated by a merge index on the merge candidate list as a motion vector of the current block. The merge index may be signaled by the encoding apparatus. Motion information may include a motion vector and a reference picture. When motion information of a temporal neighboring block is used in the skip mode and the merge mode, a highest picture in a reference picture list may be used as a reference picture.

In the case of the skip mode, a difference (residual) between a prediction sample and an original sample is not transmitted, distinguished from the merge mode.

In the case of the MVP mode, the motion vector of the current block may be derived using a motion vector of a neighboring block as a motion vector predictor. Here, the neighboring block may include a spatial neighboring block and a temporal neighboring block.

When the merge mode is applied, for example, a merge candidate list can be generated using a motion vector of a reconstructed spatial neighboring block and/or a motion vector corresponding to a Col block which is a temporal neighboring block. A motion vector of a candidate block selected from the merge candidate list is used as the motion vector of the current block in the merge mode. The aforementioned information about prediction may include a merge index indicating a candidate block having the best motion vector selected from candidate blocks included in the merge candidate list. Here, the predictor 250 may derive the motion vector of the current block using the merge index.

When the MVP (Motion Vector Prediction) mode is applied as another example, a motion vector predictor candidate list may be generated using a motion vector of a reconstructed spatial neighboring block and/or a motion vector corresponding to a Col block which is a temporal neighboring block. That is, the motion vector of the reconstructed spatial neighboring block and/or the motion vector corresponding to the Col block which is the temporal neighboring block may be used as motion vector candidates. The aforementioned information about prediction may include a prediction motion vector index indicating the best motion vector selected from motion vector candidates included in the list. Here, the predictor 250 may select a prediction motion vector of the current block from the motion vector candidates included in the motion vector candidate list using the motion vector index. The predictor of the encoding apparatus may obtain a motion vector difference (MVD) between the motion vector of the current block and a motion vector predictor, encode the MVD and output the encoded MVD in the form of a bitstream. That is, the MVD can be obtained by subtracting the motion vector predictor from the motion vector of the current block. Here, the predictor 250 may acquire a motion vector included in the information about prediction and derive the motion vector of the current block by adding the motion vector difference to the motion vector predictor. In addition, the predictor may obtain or derive a reference picture index indicating a reference picture from the aforementioned information about prediction.

The adder 260 can add a residual sample to a prediction sample to reconstruct a current block or a current picture. The adder 260 may reconstruct the current picture by adding the residual sample to the prediction sample in units of a block. When the skip mode is applied, a residual is not transmitted and thus the prediction sample may become a reconstructed sample. Although the adder 260 is described as a separate component, the adder 260 may be a part of the predictor 250.

The filter 270 may apply deblocking filtering, sample adaptive offset and/or ALF to the reconstructed picture. Here, sample adaptive offset may be applied in units of a sample after deblocking filtering. The ALF may be applied after deblocking filtering and/or application of sample adaptive offset.

The memory 280 may store a reconstructed picture or information necessary for decoding. Here, the reconstructed picture may be the reconstructed picture filtered by the filter 270. For example, the memory 280 may store pictures used for inter-prediction. Here, the pictures used for inter-prediction may be designated according to a reference picture set or a reference picture list. A reconstructed picture may be used as a reference picture for other pictures. The memory 280 may output reconstructed pictures in an output order.

Meanwhile, when the motion vector of the neighboring block of the current block is derived as a motion vector predictor (MVP) as described above, methods for improving the accuracy of the MVP may be applied to reduce the amount of information on the motion vector difference (MVD) of the current block. In other words, methods of deriving an MVP similar to the motion vector of the current block can be applied.

In this case, the neighboring block may include a spatially adjacent spatial neighboring block existing in a current picture, and a temporally adjacent temporal neighboring block existing in a reference picture. Here, the MVP of the temporal neighboring block may be referred to as a temporal motion vector predictor (TMVP), and the reference picture including the temporal neighboring block may be referred to as a collocated picture (colPic). In addition, a corresponding block at a specific position in the collocated picture corresponding to the current block may be derived as the temporal neighboring block, and a motion vector of the temporal neighboring block may be used as the MVP. Here, the corresponding block may be a block around the lower right corner of the collocated block in the collocated picture, or a center lower right block. The corresponding block may be referred to as a collocated prediction block (colPB) or a collocated prediction unit (colPu). Here, the collocated block may indicate a block having the same position and size as the current block on the collocated picture. On the other hand, when motion data compression is applied, the corresponding block may correspond to one block located in a certain area with respect to the lower right corner block or the center lower right block. For example, when the motion information is stored in units of 16×16, the corresponding block may be the upper left block of the 16×16 area covering the upper left sample position of the lower right corner neighboring bloc or the center lower right block. As another example, when the motion information is stored in units of 4×4, the corresponding block may be the upper left block of the 4×4 area covering the upper left sample position of the lower right corner neighboring bloc or the center lower right block.

As described above, the motion vector of the current block may be derived based on the motion vector of the corresponding block determined based on the current block, but since neighboring blocks of the current block including the current block have motion vectors, the motion vector of the corresponding block determined based on the current block may not indicate a reference block for the current block, and when considering the movement of an object, neighboring blocks may have a motion vector similar to the motion vector of the current block rather than the corresponding block determined in the collocated picture based on the position of the current block. That is, the motion vector of the corresponding block derived without considering the motion information of the neighboring blocks may not indicate the reference block for the current block. Therefore, in order to derive the motion vector of the current block reflecting the motion information of the current block and the neighboring blocks, a method of updating the position of the corresponding block and improving the prediction accuracy of the current block through the motion information of the updated corresponding block is proposed.

Figure 3:
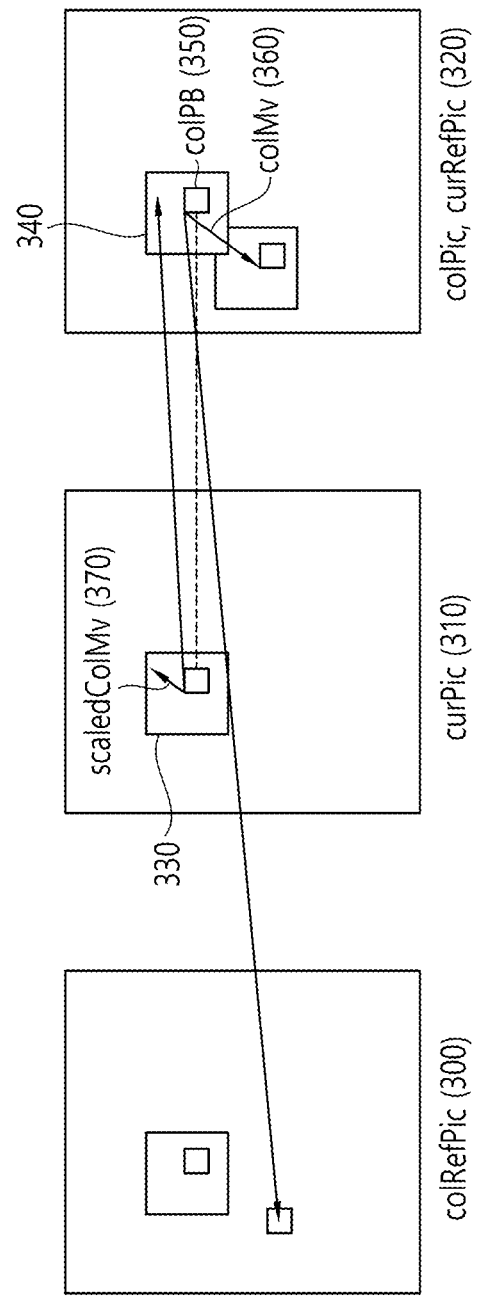
FIG. 3 illustrates an example of a method of deriving the TMVP for the current block.

FIG. 3 illustrates an example of a method of deriving the TMVP for the current block. The corresponding block may be derived as a block around the lower right corner of the collocated block 340 in the collocated picture 320, and the collocated motion vector (colMv) 360 of the corresponding block may be derived as the MVP of the current block. In addition, if the lower right corner neighboring block is not available, the corresponding block may be derived to the center right lower end block 350 of the collocated block 340. For convenience of description, FIG. 3 shows an example that the center right lower end block of the collocated block 340 is derived as the corresponding block 350. Referring to FIG. 3, the motion vector (colMv) 360 of the corresponding block 350 located at the lower right center of the collocated block 340 in the collocated picture 320 can be scaled based on a first temporal distance between the collocated picture 320 and the reference picture 300 of the corresponding block 350 and a second temporal distance between the collocated picture 320 and the current picture 310. In particular, the coding apparatus may derive a scaled collocated motion vector 370 (scaled colMv) by scaling the colMv 360 with a distance ratio of the first time distance to the second time distance. Here, the first time distance may be a difference between a picture order count (POC) value of the collocated picture 320 and a POC value of the reference picture 300 of the corresponding block 350, and the second time distance may be a difference between a POC value of the collocated picture 320 and a POC value of the current picture 310.

The method of deriving TMVP shown in FIG. 3 may reflect a neighboring block adjacent to the current block 330 or motion information of the corresponding block 350. However, in this case, the reference block derived based on the scaledcolMv 370 may not be the best reference block for deriving the prediction block of the current block.

Figure 4:
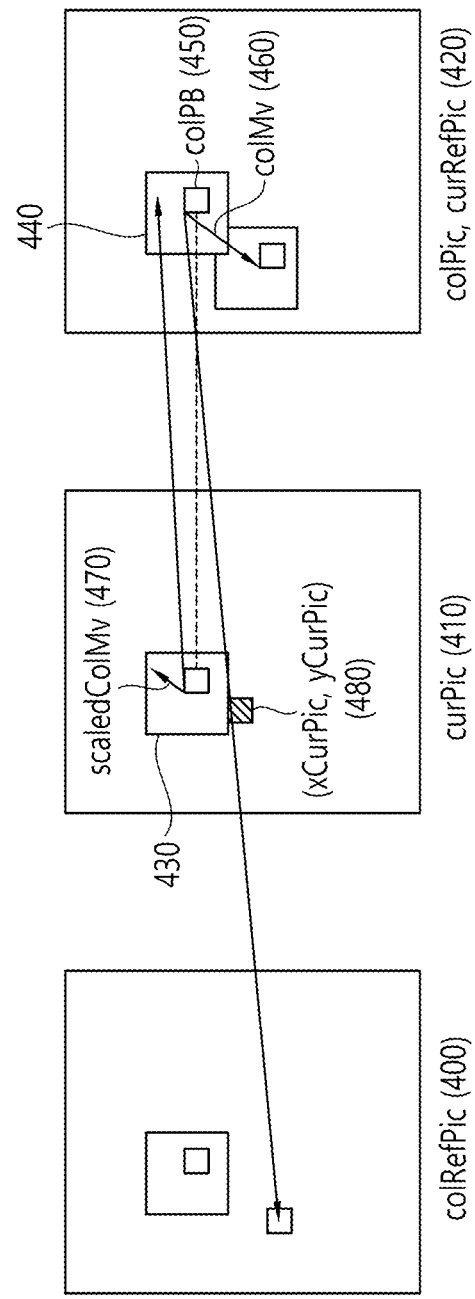
FIG. 4 illustrates an example of a difference between a position of a current block generated when a motion vector of a current block is derived based on a corresponding block at a fixed position, and a position where a motion vector of the corresponding block is projected onto a current picture.

FIG. 4 illustrates an example of a difference between a position of a current block generated when a motion vector of a current block is derived based on a corresponding block at a fixed position, and a position where a motion vector of the corresponding block is projected onto a current picture. Referring to FIG. 4, when a motion vector of the current block 430 is derived based on the corresponding block 450 at a fixed position, the coding apparatus can scale the motion vector (colMv) 460 of the corresponding block 450 with a distance ratio of the first time distance and the second time distance and induce a specific position 480 on the current picture derived from the colMv 460 by being mirrored to the current picture 410. In other words, the specific position 480 may be derived by projecting the colMv 460 onto the current picture 410 rather than the reference picture 420 of the corresponding block 450. Here, for example, the coordinate value of the specific position 480 may be expressed as (xCurPic, yCurPic), and the distance ratio may be derived by dividing the second time distance by the first time distance.

Referring to FIG. 4, there can be a difference between the specific position 480 at which the motion vector 460 of the corresponding block 450 was projected onto the current picture 410, and the position of the current block 430. That is, since the colMv 460 points to the specific position 480 of the current picture 410 without pointing to the current block 430, the colMv 460 may be more suitable as a reference block of a block located at the specific position 480 (xCurPic, yCurPic) than the reference block of the current block 430.

Therefore, a method of updating the position of the corresponding block may be applied to derive an optimal reference block for the current block.

Figure 5:
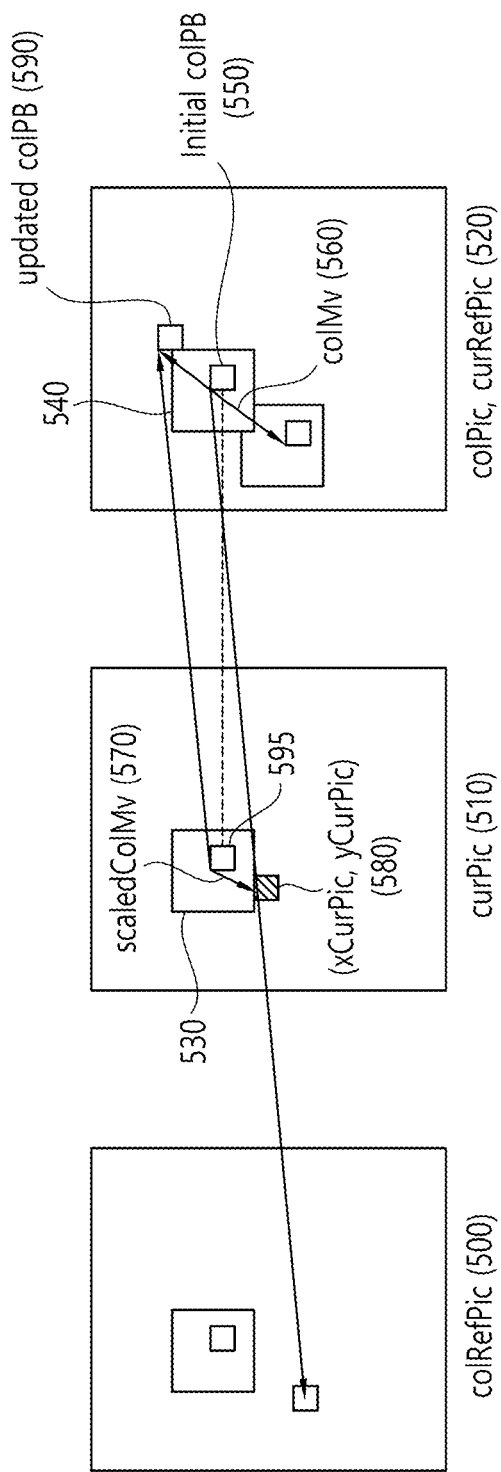
FIG. 5 illustrates an example of a method for updating the position of the corresponding block.

FIG. 5 illustrates an example of a method for updating the position of the corresponding block. Referring to FIG. 5, instead of deriving the motion vector 560 of the corresponding block 550 at the previously determined position as the MVP of the current block 530, the coding apparatus may derive the updated corresponding block 590 at the position by updating the position of the corresponding block 550 as the position having the optimal motion vector. Here, the corresponding block 550 of the existing predetermined position may be referred to as an initial colPB (collocated predicated block) or an initial colPU (collocated predication unit). Specifically, the coding apparatus can project the motion vector 560 of the initial colPB 550 onto the current picture 530, and can determine whether the projected motion vector 570 indicates a position indicating the current block 530 That is, the coding apparatus can scale the motion vector 560 of the initial colPB 550 based on the distance ratios of the first time distance and the second time distance, and may determine whether the current block 530 is indicated by mirroring the scaled motion vector 570 to the current picture 510. Here, when the corresponding block 550 is derived as the center right lower block 550 of the collocated block 540, the position indicating the current block 530 may be predetermined as a specific position, for example, the upper left sample position of the center right lower block 595 of the current block, and when the corresponding block 550 is derived as the lower right corner neighboring block of the collocated block 540, the position indicating the current block 530 may be the upper left sample position of the block around the lower right corner of the current block. Or the top left corner of the block or any other predefined specific position may be used as a position to represent the block.

If the projected motion vector 570 does not point to the current block 530, the coding apparatus may derive the updated corresponding block 590 based on the difference between the position of the current block 530 and the specific position 580 of the block to which the projected motion vector 570 points. The coding apparatus may derive a block at the position shifted by the difference at the position of the initial colPB 550 in the collocated picture 520 as the updated corresponding block 590, and may derive the motion vector of the updated corresponding block 590 as the TMVP of the current block.

Figure 6:
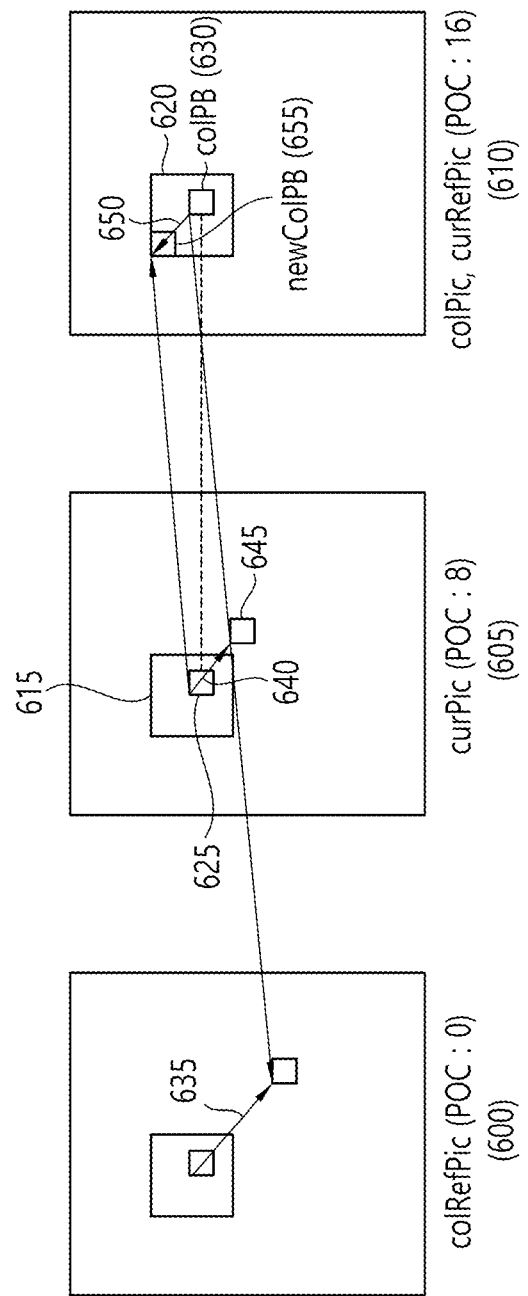
FIG. 6 illustrates another example of a method for updating the position of the corresponding block.

FIG. 6 illustrates another example of a method for updating the position of the corresponding block. Referring to FIG. 6, the corresponding block (colPB) 630 of the predetermined position may be derived as the center right lower end block 630 of the collocated block 620 in the collocated picture 610, and the specific position indicating the current block 615 may be the upper left sample position of the center right lower block 625 of the current block 615. In this case, the coding apparatus may scale the motion vector colMv 635 of the corresponding block 630 based on the distance ratio of the first time distance and the second time distance. Referring to FIG. 6, the colMv 635 may be (98, 10), the first temporal distance may be derived as 16 obtained by subtracting the POC value 0 of the reference picture 600 of the corresponding block 630 from 16 which is the POC value of the collocated picture 610, and the second temporal distance may be derived as 8 obtained by subtracting the POC value 8 of the current picture 605 from 16 which is the POC value of the collocated picture 610. The distance ratio between the first time distance and the second time distance may be derived by dividing the second time distance by the first time distance, and thus may be derived as ½. Thus, the coding apparatus may derive a projected motion vector 640 (projMv) projected in the current picture 605 by scaling the colMv 635 with the distance ratio, in which case the projected motion vector (640) can be derived as (49, 5). Since the projected motion vector 640 does not point to the current block 615 but points to a neighboring block 645 at a position away from the current block by (49, 5) in the lower right direction, the coding apparatus may derive an updated corresponding block 655 by reflecting the difference between the position of the current block 615 and the position of the neighboring block 645 indicated by the projected motion vector 640. Specifically, the coding apparatus can derive the projected motion vector 640 as a motion vector 650 scaled in a direction opposite to the direction indicated by the projected motion vector 640 and can derive the block at a position indicated by the motion vector 650 in the corresponding block 630, as the updated corresponding block 655. The updated corresponding block 655 may be referred to as an updated collocated prediction block (updatedcolPB), an updated collocated prediction unit (updated colIPU), a new collocated prediction block (newcolPB), or a new collocated prediction unit (newPOLU). If the updated corresponding block 655 is derived, the coding apparatus may derive the motion vector of the updated corresponding block 655 as the TMVP of the current block.

Further, FIGS. 5 and 6 only illustrate the case where the position of the previously designated initial colPB is the center right lower block of the collocated block in the collocated picture, but the initial colPB may be one of the following blocks.

the block indicated by the motion vector of the left neighbor block of the current block
the block indicated by the motion vector of the upper left neighbor block of the current block
the block indicated by the motion vector of the upper neighboring block of the current block
the block indicated by the motion vector of the upper right neighbor block of the current block
the block indicated by the motion vector of the lower left neighbor block of the current block
all possible blocks belonging to the collocated block on the collocated picture
blocks adjacent to the left of the collocated block on the collocated picture
blocks adjacent to the upper left corner of the collocated block on the collocated picture
blocks adjacent to the top of the collocated block on the collocated picture
blocks adjacent to the upper right corner of the collocated block on the collocated picture
blocks adjacent to the right of the collocated block on the collocated picture
blocks adjacent to the lower right corner of the collocated block on the collocated picture
blocks adjacent to the low side of the collocated block on the collocated picture
blocks adjacent to the lower left corner of the collocated block on the collocated picture The initial colPB may be one or more of the blocks described above. That is, when a plurality of TMVPs for the current block are present (or derived), a plurality of initial colPBs may exist. The plurality of TMVPs may be derived from the same initial colPB, or each of the plurality of TMVPs may be derived from another initial colPB. Also, one updated colPB can be derived from two or more initial colPBs. When there are a plurality of initial colPBs, a combination of the above-described methods and a method of deriving the TMVP for the current block in all possible orders can be applied.

In the method of updating the corresponding block described above, the influence of the initial collocated block (colPB) at the previously designated position may largely act, and thus it may be limited to derive the optimal motion vector for the current block. Accordingly, a method of deriving the updated corresponding block colPB based on the initial colPB and constructing a plurality of updated corresponding blocks using motion vectors of neighboring blocks of the updated corresponding block may be applied.

Figure 7:
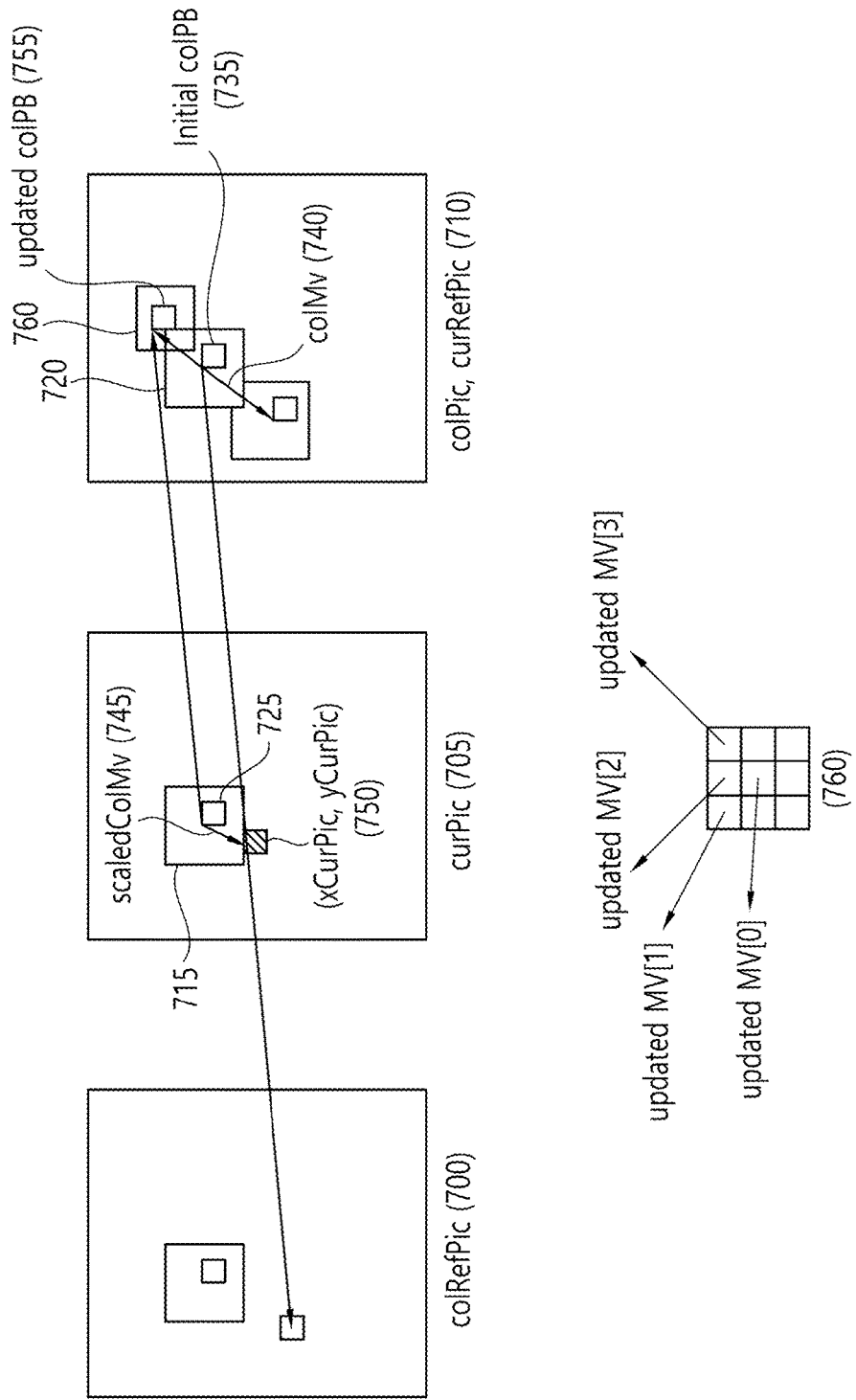
FIG. 7 illustrates an example of deriving motion vectors of blocks included in a specific area of a predetermined size including the updated corresponding block and neighboring blocks of the updated corresponding block.

FIG. 7 illustrates an example of deriving motion vectors of blocks included in a specific area of a predetermined size including the updated corresponding block and neighboring blocks of the updated corresponding block. Referring to FIG. 7, the coding apparatus may derive a corresponding block 735 corresponding to the current block 715 in the collocated picture 710, and the motion vector 740 of the corresponding block 735 may be scaled based on the first distance and the second distance. The coding apparatus may derive a specific position 750 that a scaled motion vector 745 indicates at the position of the current block 715 and may derive the updated corresponding block 755 by reflecting the difference between the position of the current block 715 and the specific position 750. Here, the position of the current block 715 may be the upper left sample position of the center lower right block 725 of the current block 715.

In addition, the coding apparatus may derive a specific area 760 of a certain size, including the updated corresponding block 755 and the updated corresponding block 755. The coding apparatus can derive a motion vector list based on the motion vectors of the blocks included in the specific area 760. Specifically, the coding apparatus may derive the motion vector list by arranging the motion vectors of the blocks included in the specific area 760 in an arbitrary order, and may derive one motion vector or a combination of a plurality of motion vectors in the motion vector list, as the TMVP of the current block 715. Referring to FIG. 7, a specific area 760 including the updated corresponding block 755 and eight neighboring blocks adjacent to the updated corresponding block 755 may be derived. The size and position of the specific area may be variously applied.

Further, as an example of the order of listing the motion vectors, the coding apparatus applies scaling and mirroring to each motion vector of the motion vector list on the basis of the first distance and the second distance, to thereby be projected to the current block, and when each of the motion vectors is projected onto the current block, the motion vectors may be arranged in the order of a specific reference point for the current block at a position indicated by each motion vector. The reference point may be set to an arbitrary position included in the current block or an adjacent external area. Specifically, the lower right sample position among the four samples positioned at the center of the current block may be set as the reference point. In this case, the coordinates of the reference point can be expressed by the following equation.

$$\text{Center}((x\text{Pic}+(\text{width}>>1), y\text{Pic}+(\text{height}>>1)))  \quad \text{[Equation 1]}$$

Here, xPic denotes the x component of the upper left coordinates of the current block, yPic denotes the y component of the upper left coordinates of the current block, the width denotes the width of the current block, and the height denotes the height of the current block.

When the position of the reference point (xCenterPic, yCenterPic) corresponds to a position (xCurPic, yCurPic) indicated when each motion vector, which is included in the motion vector list of the specific area including the updated corresponding block, reflects onto the current block, the coding apparatus may derive a motion vector having the smallest difference in position between the reference point and the current block among the motion vectors included in the motion vector list, as the TMVP for the current block. The difference can be expressed by the following equation.

$$\text{Diff}=\text{Abs}(x\text{CentorPic}-x\text{CurPic})+\text{Abs}(y\text{CenterPic}-y\text{CurPic}) \quad \text{[Equation 2]}$$

Meanwhile, the current block may include a plurality of sub-blocks, and a motion vector (or TMVP) may be derived for each sub-block.

Figure 8:
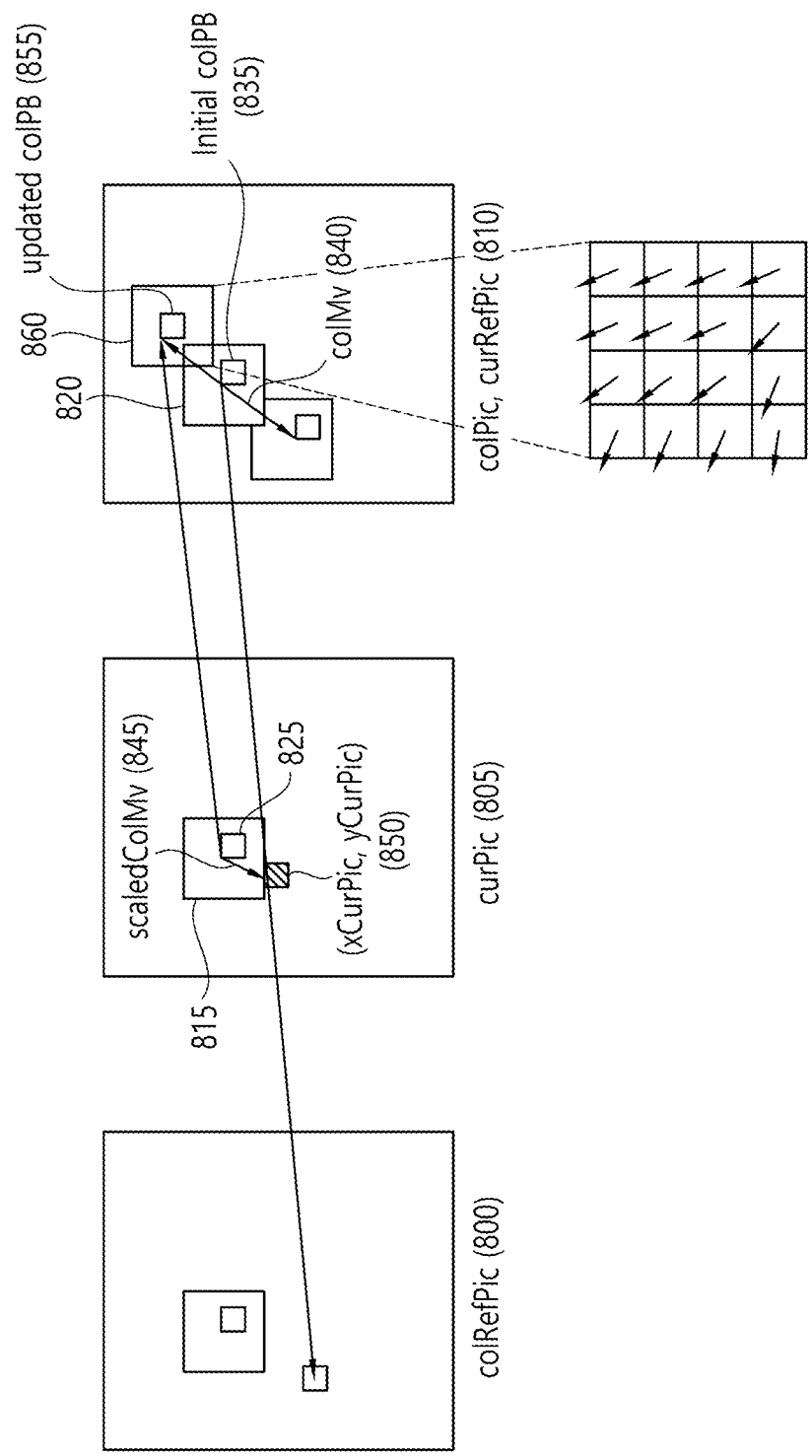
FIG. 8 illustrates an example of deriving motion vectors of blocks included in a specific area having the same size as the current block including the updated corresponding block.

FIG. 8 illustrates an example of deriving motion vectors of blocks included in a specific area having the same size as the current block including the updated corresponding block. Referring to FIG. 8, the coding apparatus may derive a corresponding block 835 corresponding to the current block 815 in the collocated picture 810, and the motion vector 840 of the corresponding block 835 may be scaled based on the first distance and the second distance. The coding apparatus may derive a specific position 850 that a scaled motion vector 845 indicates at the position of the current block 815 and may derive the updated corresponding block 855 by reflecting the difference between the position of the current block 815 and the specific position 850. Here, the position of the current block 815 may be the upper left sample position of the center lower right block 825 of the current block 815.

Further, referring to FIG. 8, the coding apparatus may derive a specific area 860 of a certain size, including the updated corresponding block 855 and the updated corresponding block 855. The coding apparatus can extend the specific area 860 by the size of the current block 815 on the basis of the block closest to the specific reference point for the current block (i.e., the updated corresponding block 855 at a position which reflects the difference between the position of the current block 815 and the specific position 850 in the corresponding block 835) and can derive the motion vector (or TMVP) for each sub-block of the current block based on the motion vectors of the blocks included in the specific area 860. Specifically, the coding apparatus may derive a specific area 860 of the same size as the size of the current block 815 including the updated corresponding block 855 and may derive a motion vector (or TMVP) of each sub-block based on a motion vector of a corresponding block included in the specific area 860 corresponding to each sub-block of the current block 815.

Meanwhile, the TMVP for the current block derived based on the updated corresponding block may be included as a candidate of a merge candidate list of the current block or a motion vector predictor (MVP) candidate list. That is, when the merge mode is applied to the current block, the motion information of the updated corresponding block may be included as a merge candidate in the merge candidate list of the current block, and when the MVP mode is applied to the current block, the motion information of the updated corresponding block may be included as an MVP candidate in the MVP candidate list of the current block. Here, the decoding apparatus may determine whether a merge mode or an MVP mode is applied to the current block based on information indicating a prediction mode of a current block received from the encoding apparatus, and the motion information of the updated corresponding block may include the motion vector of the updated corresponding block.

For example, when the merge mode is applied to the current block and the updated corresponding block is not derived, the merged candidate list may include motion information of a left lower corner neighboring block A0, a right upper corner neighboring block B0 and/or an upper left corner neighboring block B2 of the current block, as merge candidates. The merge candidate list may include motion information of the left end neighboring block A1 of the current block and/or the upper end neighboring block B1 of the current block as merge candidates. At this time, the left end neighboring block A1 may be the block located at the bottom of the blocks adjacent to the left of the current block, and the upper end neighboring block B1 may be located at the right end of the blocks adjacent to the upper end of the current block. The left lower corner neighboring block A0, the left end neighboring block A1, the upper left corner neighboring block B0, the upper left neighboring block B1 and the left upper left corner neighboring block B2 may correspond to a neighboring block of the current block located in the current picture. Accordingly, merge candidates derived from the merge candidate blocks may be referred to as spatial merge candidates.

Also, the motion information of the corresponding block may be used as a merge candidate included in the merge candidate list. As described above, the corresponding block may correspond to a block in the collocated picture other than the current picture. Since the corresponding block is a block derived from the collocated picture, the merge candidate derived from the corresponding block may be referred to as a temporal merge candidate. In another aspect, the temporal merge candidate may be referred to as a temporal motion vector predictor (TMVP) since it can be used for motion vector prediction of a current block. Also, the merge candidate list may include an Advanced Temporal Motion Vector Predictor (ATMVP) derived from the motion information of the corresponding block, and may include an Advanced Temporal Motion Vector Predictor-Extension (ATMVP-Ext).

Also, the merge candidate list may include merge candidates for bidirectional prediction derived through a combination of the merge candidates described above. The merge candidate for bi-directional prediction derived through the above combination may be called Combined Bi-pred. Further, the merge candidate list may include a zero vector, and the zero vector may be called a zero MV.

Meanwhile, when a merge mode is applied to the current block and the updated corresponding block is derived, the updated motion information of the corresponding block may be used as a merge candidate included in the merged candidate list. That is, the merge candidate list may include motion information of the updated corresponding block. The motion information of the updated corresponding block may be called new TMVP. For example, the merge candidate list may be configured by replacing the motion information of the corresponding block with the motion information of the updated corresponding block. Specifically, the merge candidate list may be as follows.

{A1, B1, B0, A0, B2, new TMVP, Combined Bi-pred, Zero MV}

{A1, B1, B0, A0, ATMVP, ATMVP-Ext, B2, new TMVP, Combined Bi-pred, Zero MV}

{A1, B1, B0, A0, new TMVP, ATMVP-Ext, B2, TMVP, Combined Bi-pred, Zero MV}

The merged candidate list may be configured to include motion information of the corresponding block and additionally include motion information of the updated corresponding block, and when a plurality of updated corresponding blocks are derived, the merged candidate list may be configured such that motion information of a plurality of the updated corresponding blocks is additionally included. Specifically, the merge candidate list may be as follows.

{A1, B1, B0, A0, B2, TMVP, new TMVP, Combined Bi-pred, Zero MV}

{A1, B1, B0, A0, ATMVP, B2, TMVP, new TMVP, Combined Bi-pred, Zero MV}

{A1, B1, B0, A0, ATMVP, B2, TMVP, new TMVP[0], new TMVP[1], Combined Bi-pred, Zero MV}

Alternatively, it is possible to derive the merge candidate list by changing the above-described update process to be included in the corresponding block search process of deriving the motion information of the corresponding block as a merge candidate of the merge candidate list. If the merged candidate list is derived by changing the above-described update process to be included in the corresponding block search process of the merge candidate indicating the motion information of the corresponding block, the merge candidate list may be as follows.

{A1, B1, B0, A0, B2, updated TMVP, Combined Bi-pred, Zero MV}

{A1, B1, B0, A0, updated ATMVP, B2, TMVP, Combined Bi-pred, Zero MV}

Here, updated TMVP and updated ATMVP may indicate the motion information of the updated corresponding block.

In the case of deriving a merge candidate list including the motion information of the updated corresponding block through the above-described method, the order of candidates in the merge candidate list or the number of candidates may be changed and may be applied to both TMVP and ATMVP or only one of TMVP and ATMVP. Also, the number of proposed methods can be changed and the nature of candidates may be different. For example, the new TMVP [0] may represent the motion information of the updated corresponding block, and the new TMVP [1] may indicate motion information on a motion vector indicating a position closest to a specific reference point of the current block among motion vectors of a specific area including the updated corresponding block. In addition, different MVPs may be included for merge candidate lists of respective sub-blocks of the current block.

Whether or not the above-described updating method of the corresponding block for the TMVP of the merge candidate list is applied and the number of TMVPs applied can be applied to the entire image in the same manner. Alternatively, information on whether or not to apply the update method of the corresponding block to the TMVP through a parameter set such as a picture parameter set (PPS) unit, a sequence parameter set (SPS) unit, a video parameter set (VPS) unit, and a slice header unit and the number of TMVPs applied may be signaled.

Further, in order to derive a plurality of TMVP (TMVP [0], TMVP [1] TMVP [N]) equally in the entire image, the candidate number of the merge candidate list in the merge mode or MVP candidate list in the MVP mode may increase, information indicating to derive TMVP [0] and the TMVP [0] to be included as the merge candidate or MVP candidate may be signaled to a specific image and block, and information indicating to derive TMVP [1] and the TMVP [1] to be included as the merge candidate or MVP candidate may be signaled to a specific image and block. Herein the TMVP [0] may represent motion information of the updated corresponding block, TMVP [1] may represent motion information on a motion vector indicating a position closest to a specific reference point of the current block among motion vectors of a specific area including the updated corresponding block In order to apply the method of deriving the TMVP [0] or the TMVP [1] to a specific image, a prediction mode type (merge mode or MVP mode) of a current block or a neighboring block of the current block, a block size, and a prediction mode type (merge mode or MVP mode) of the corresponding block for the block, etc. may be considered. The method of constructing the merge candidate list or the MVP candidate list by deriving the TMVP [0] and the TMVP [1] described above is merely an example, and a method of constructing the merge candidate list or the MVP candidate list through the substitution, addition, and change application described above can all be applied.

Figure 9:
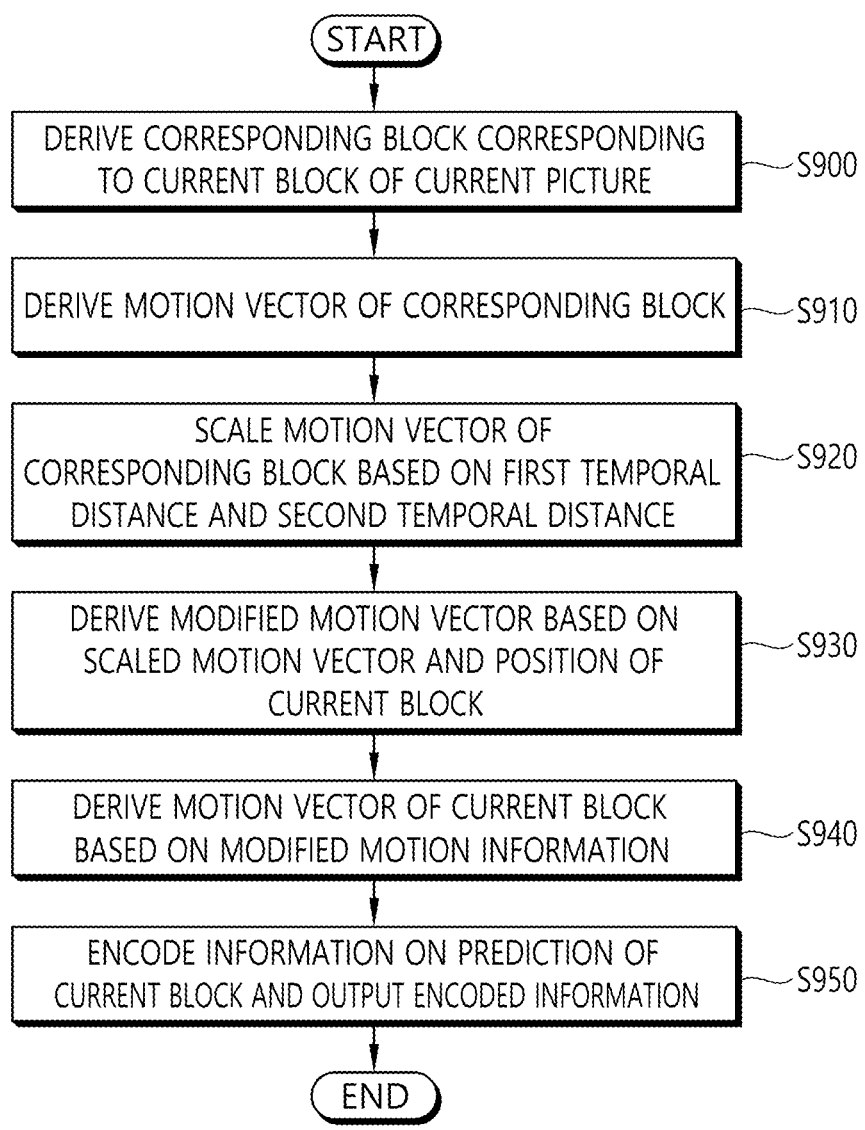
FIG. 9 schematically illustrates a video encoding method by an encoding apparatus according to the present invention.

FIG. 9 schematically illustrates a video encoding method by an encoding apparatus according to the present invention. The method of FIG. 9 can be performed by the encoding apparatus of FIG. 1. Specifically, for example, steps S900 to S940 of FIG. 9 may be performed by the prediction unit of the encoding apparatus, and step S950 may be performed by the entropy encoding unit of the encoding apparatus.

The encoding apparatus derives a corresponding block corresponding to the current block of the current picture (S900). The encoding apparatus may derive a corresponding block corresponding to the current block of the current picture, and the corresponding block may be located in a reference picture. The reference picture may be referred to as a collocated picture (colPic). Further, the corresponding block may be a block around the lower right corner of the collocated block in the collocated picture, or a center lower right block. The corresponding block may be referred to as a collocated prediction block (colPB) or a collocated prediction unit (colPu). Here, the collocated block may indicate a block having the same position and size as the current block on the collocated picture.

The encoding apparatus derives a motion vector of the corresponding block (S910). The encoding apparatus may derive a motion vector of the corresponding block.

The encoding apparatus scales the motion vector of the corresponding block based on the first time distance and the second time distance (S920). The encoding apparatus may scale the motion vector of the corresponding block based on a distance ratio between the first time distance and the second time distance. Here, the first time distance may be a difference between a picture order count (POC) value of the collocated picture and a POC value of the reference picture of the corresponding block, and the second time distance may be a difference between a POC value of the collocated picture and a POC value of a picture including the current block. Also, the distance ratio may be derived by dividing the second time distance by the first time distance. The encoding apparatus may derive a scaled motion vector by multiplying the motion vector of the corresponding block by the distance ratio.

For example, the POC value of the collocated picture may be 16, the POC value of the reference picture of the corresponding block may be 0, the POC value of the current picture may be 8, and the motion vector of the corresponding block may be (98, 10). In this case, the first time distance can be calculated as 16 which is obtained by subtracting 0, which is the POC value of the reference picture of the corresponding block, from the POC value of the collocated picture, and the second temporal distance can be calculated as 8, which is obtained by subtracting 8, which is the POC value of the current picture, from 16 which is the POC value of the collocated picture. The distance ratio between the first time distance and the second time distance may be derived by dividing the second time distance by the first time distance, and thus may be derived as ½. The encoding apparatus may scale the distance ratio to the motion vector of the corresponding block, in which case the scaled motion vector may be derived as (49, 5).

The encoding apparatus derives a modified motion vector based on the scaled motion vector and the position of the current block (S930). The encoding apparatus may derive a corresponding block updated based on the scaled motion vector and the position of the current block to derive the modified motion vector, and the modified motion vector may be derived based on the motion vector of the updated corresponding block. In addition, the encoding apparatus may derive a position indicated by the scaled motion vector at a position of the current block, and may determine whether the scaled motion vector indicates a position of the current block. If the scaled motion vector does not indicate the position of the current block, the encoding apparatus may derive the modified motion vector. In particular, the encoding apparatus may derive a position indicated by the scaled motion vector at a position of the current block, and it is possible to determine whether the modified motion vector is derived based on a difference between a position indicated by the scaled motion vector and a position of the current block. If the difference between the position indicated by the scaled motion vector and the position of the current block is greater than or equal to a certain value, it can be determined that the corrected motion vector is derived. Here, the position of the current block may be the upper left sample position of the center lower right block of the current block, or the upper left sample position of the block around the lower right corner of the current block. When the corresponding block is derived as the center right lower end block of the collocated block, the position of the current block may be the upper left sample position of the center right lower end block of the current block, and when the corresponding block is derived as the lower right corner neighboring block of the collocated block, the position of the current block may be the upper left sample position of the lower right corner neighboring block of the current block.

If the scaled motion vector does not point to the current block (i.e., if the difference between the position indicated by the scaled motion vector and the current block position is greater than or equal to a certain value), the encoding apparatus can derive the updated corresponding block based on the difference between the position of the current block and the position indicated by the scaled motion vector at the position of the current block, and can derive the modified motion vector based on the motion vector of the updated corresponding block.

For example, the encoding apparatus may derive a position indicated by the scaled motion vector at a position of the current block, and may derive a difference between a position of the current block and a position indicated by the scaled motion vector. Next, the encoding apparatus can derive the block at a position shifted by the difference in a direction opposite to the scaled motion vector from a position of the corresponding block in the collocated picture, as the updated corresponding block.

As another example, in deriving the updated corresponding block, a plurality of updated corresponding blocks may be derived. For example, the encoding apparatus may derive a specific area including a block at a position shifted by the difference in the opposite direction of the scaled motion vector at the position of the corresponding block. The encoding apparatus may derive the blocks included in the specific area as the plurality of updated corresponding blocks. Meanwhile, the size of the specific area may be the same as the size of the current block, and the current block may be divided into a plurality of sub-blocks. In this case, a motion vector of each sub-block of the current block may be derived based on a motion vector of the updated corresponding block corresponding to each sub-block among the plurality of updated corresponding blocks.

The encoding apparatus derives a motion vector of the current block based on the modified motion vector (S940). For example, the encoding apparatus may construct a merge candidate list or a motion vector predictor (MVP) candidate list based on the prediction mode for the current block, and the merge candidate list or MVP candidate list may include candidates representing the modified motion vectors. The prediction mode may be determined to be one of a merge mode and an MVP mode.

On the other hand, the candidate indicating the modified motion vector included in the merge candidate list or MVP candidate list may be called a temporal motion vector predictor (TMVP) or an advanced temporal motion vector predictor (ATMVP). Alternatively, the candidate indicating the modified motion vector may be called new TMVP, new ATMVP, updated TMVP, or updated ATMVP. The candidate indicating the modified motion vector may replace a temporal candidate representing the motion vector of the corresponding block in the merge candidate list or the MVP candidate list. In addition, the merge candidate list or MVP candidate list may include a spatial candidate and a temporal candidate, and the candidate representing the modified motion vector may be included in the merge candidate list or the MVP candidate list as additional temporal candidates.

On the other hand, if a plurality of updated corresponding blocks are derived, the encoding apparatus can scale the motion vectors of the plurality of updated corresponding blocks based on the first time distance and the second time distance, and may derive a scaled motion vector indicating a position closest to a specific reference point of the current block among the scaled motion vectors. That is, the encoding apparatus can derive the positions indicated by the scaled motion vectors at the position of the current block, and derive the scaled motion vector at a position nearest to the specific reference point among the positions. The encoding apparatus may derive a motion vector of a specific updated corresponding block having the derived scaled motion vector and derive the modified motion vector based on the motion vector of the specific updated corresponding block. That is, the encoding apparatus can construct the merge candidate list or the MVP candidate list including candidates indicating the motion vectors of the specific updated corresponding block. Accordingly, the merge candidate list or MVP candidate list of the current block may include a candidate indicating a motion vector of the specific updated corresponding block.

Herein, the reference point may be set to an arbitrary position included in the current block or an adjacent external area. For example, the lower right sample position among the four samples positioned at the center of the current block may be set as the reference point. The coordinates of the reference point may be derived based on the above-described equation 1. Also, the difference between the positions indicated by the scaled motion vectors and the specific reference point can be derived based on Equation 2, and the position having the smallest difference can be derived as a position closest to the specific reference point.

Further, if the size of the specific area is equal to the size of the current block and the current block is divided into a plurality of sub-blocks, the motion vector of each sub-block of the current block may be derived based on the motion vector of the updated corresponding block corresponding to each sub-block among the updated corresponding blocks. That is, the encoding apparatus can construct the merge candidate list or the MVP candidate list for each sub-block including the candidate indicating the motion vector of the updated corresponding block corresponding to each sub-block. Accordingly, the merge candidate list or MVP candidate list of each sub-block may include a candidate indicating a motion vector of the updated corresponding block.

The encoding apparatus encodes the prediction information of the current block and outputs the encoded information (S950). The encoding apparatus can encode the information on the prediction to thereby be outputted in the form of a bitstream. The bitstream may be transmitted to a decoding apparatus via a network or a storage medium. Also, the encoding apparatus may encode information indicating whether the updated corresponding block for the current block is derived through a parameter set such as a picture parameter set (PPS) unit, a sequence parameter set (SPS) unit, a video parameter set (VPS) unit and the number of candidates representing the motion vector of the updated corresponding block, and output the encoded information. The information may be included in prediction information of the current block. In addition, the encoding apparatus may encode information indicating whether a plurality of updated corresponding blocks are derived, and output the encoded information. Also, the encoding apparatus may encode and output information indicating a prediction mode of the current block. The prediction mode may be merge mode or MVP mode. The information indicating the prediction mode may be included in information on the prediction of the current block.

Meanwhile, although not shown in FIG. 9, prediction samples can be derived based on the motion vector of the current block. The encoding apparatus may generate a residual sample based on the original sample of the original picture and the derived prediction sample. The encoding apparatus may generate information on the residual based on the residual samples. The information on the residual may include transform coefficients relating to the residual sample.

Figure 10:
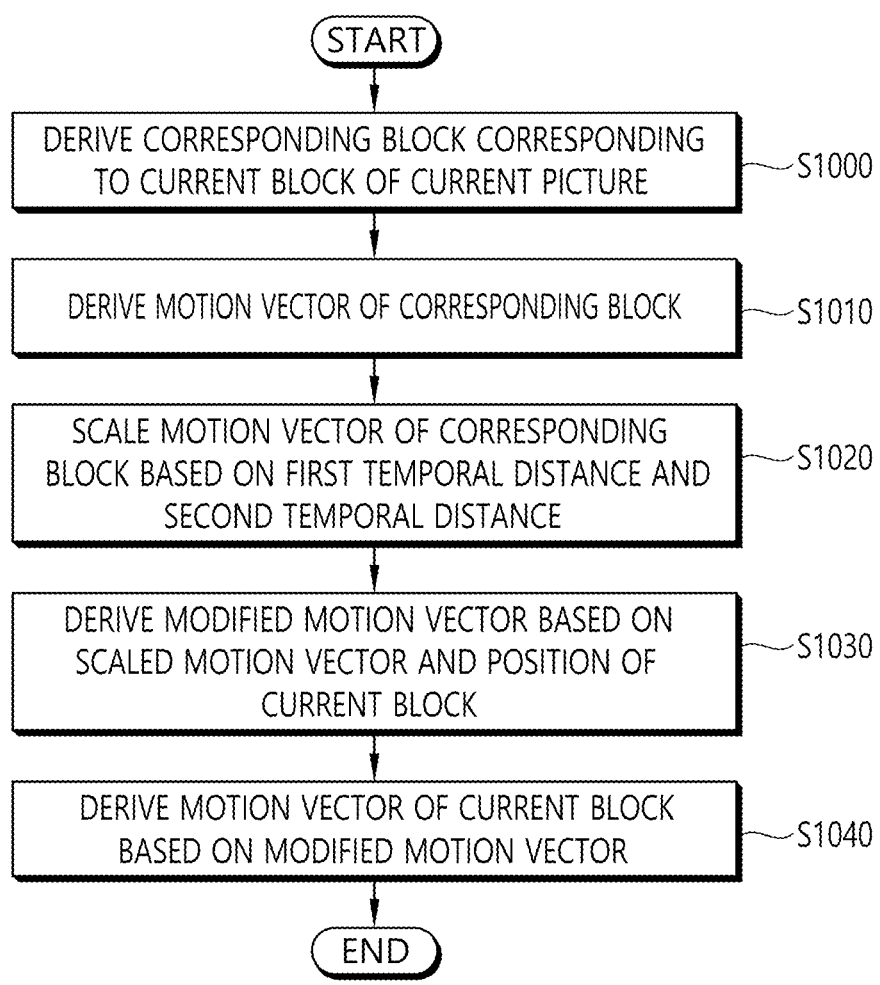
FIG. 10 schematically illustrates a video decoding method by a decoding apparatus according to the present invention.

FIG. 10 schematically illustrates a video decoding method by a decoding apparatus according to the present invention. The method disclosed in FIG. 10 can be performed by the decoding apparatus disclosed in FIG. 2. Specifically, for example, steps S1000 to S1040 in FIG. may be performed by the prediction unit of the decoding apparatus.

The decoding apparatus derives a corresponding block corresponding to the current block of the current picture (S1000). The decoding apparatus may derive a corresponding block corresponding to the current block of the current picture, and the corresponding block may be located in a reference picture. The reference picture may be referred to as a collocated picture (colPic). Further, the corresponding block may be a block around the lower right corner of the collocated block in the collocated picture, or a center lower right block. The corresponding block may be referred to as a collocated prediction block (colPB) or a collocated prediction unit (colPu). Here, the collocated block may indicate a block having the same position and size as the current block on the collocated picture.

The decoding apparatus derives a motion vector of the corresponding block (S1010). The decoding apparatus may derive a motion vector of the corresponding block.

The decoding apparatus scales the motion vector of the corresponding block based on the first time distance and the second time distance (S1020). The decoding apparatus may scale the motion vector of the corresponding block based on a distance ratio between the first time distance and the second time distance. Here, the first time distance may be a difference between a picture order count (POC) value of the collocated picture and a POC value of the reference picture of the corresponding block, and the second time distance may be a difference between a POC value of the collocated picture and a POC value of a picture including the current block. Also, the distance ratio may be derived by dividing the second time distance by the first time distance. The decoding apparatus may derive a scaled motion vector by multiplying the motion vector of the corresponding block by the distance ratio.

For example, the POC value of the collocated picture may be 16, the POC value of the reference picture of the corresponding block may be 0, the POC value of the current picture may be 8, and the motion vector of the corresponding block may be (98, 10). In this case, the first time distance can be calculated as 16 which is obtained by subtracting 0, which is the POC value of the reference picture of the corresponding block, from the POC value of the collocated picture, and the second temporal distance can be calculated as 8, which is obtained by subtracting 8, which is the POC value of the current picture, from 16 which is the POC value of the collocated picture. The distance ratio between the first time distance and the second time distance may be derived by dividing the second time distance by the first time distance, and thus may be derived as ½. The decoding apparatus may scale the motion vector of the corresponding block based on the distance ratio, in which case the scaled motion vector may be derived as (49, 5).

The decoding apparatus derives a modified motion vector based on the scaled motion vector and the position of the current block (S1030). The decoding apparatus may derive a corresponding block updated based on the scaled motion vector and the position of the current block to derive the modified motion vector, and the modified motion vector may be derived based on the motion vector of the updated corresponding block. In addition, the decoding apparatus may derive a position indicated by the scaled motion vector at a position of the current block, and may determine whether the scaled motion vector indicates a position of the current block. If the scaled motion vector does not indicate the position of the current block, the decoding apparatus may derive the modified motion vector. In particular, the decoding apparatus may derive a position indicated by the scaled motion vector at a position of the current block, and it is possible to determine whether the modified motion vector is derived based on a difference between a position indicated by the scaled motion vector and a position of the current block. If the difference between the position indicated by the scaled motion vector and the position of the current block is greater than or equal to a certain value, it can be determined that the corrected motion vector is derived. Here, the position of the current block may be the upper left sample position of the center lower right block of the current block, or the upper left sample position of the block around the lower right corner of the current block. When the corresponding block is derived as the center right lower end block of the collocated block, the position of the current block may be the upper left sample position of the center right lower end block of the current block, and when the corresponding block is derived as the lower right corner neighboring block of the collocated block, the position of the current block may be the upper left sample position of the lower right corner neighboring block of the current block.

If the scaled motion vector does not point to the current block, the decoding apparatus can derive the updated corresponding block based on the difference between the position of the current block and the position indicated by the scaled motion vector at the position of the current block, and can derive the modified motion vector based on the motion vector of the updated corresponding block.

For example, the decoding apparatus may derive a position indicated by the scaled motion vector at a position of the current block, and may derive a difference between a position of the current block and a position indicated by the scaled motion vector. Next, the decoding apparatus can derive the block at a position shifted by the difference in a direction opposite to the scaled motion vector from a position of the corresponding block in the collocated picture, as the updated corresponding block.

As another example, in deriving the updated corresponding block, a plurality of updated corresponding blocks may be derived. For example, the decoding apparatus may derive a specific area including a block at a position shifted by the difference in the opposite direction of the scaled motion vector at the position of the corresponding block. The decoding apparatus may derive the blocks included in the specific area as the plurality of updated corresponding blocks. Meanwhile, the size of the specific area may be the same as the size of the current block, and the current block may be divided into a plurality of sub-blocks. In this case, a motion vector of each sub-block of the current block may be derived based on a motion vector of the updated corresponding block corresponding to each sub-block among the plurality of updated corresponding blocks.

The decoding apparatus derives a motion vector of the current block based on the modified motion vector (S1040). For example, the decoding apparatus may construct a merge candidate list or a motion vector predictor (MVP) candidate list based on the prediction mode for the current block, and the merge candidate list or MVP candidate list may include candidates representing the modified motion vectors. The decoding apparatus may receive information indicating a prediction mode for the current block and may derive a prediction mode of the current block based on information indicating a prediction mode for the current block. The prediction mode may be merge mode or MVP mode.

On the other hand, the candidate indicating the modified motion vector included in the merge candidate list or MVP candidate list may be called a temporal motion vector predictor (TMVP) or an advanced temporal motion vector predictor (ATMVP). Alternatively, the candidate indicating the modified motion vector may be called new TMVP, new ATMVP, updated TMVP, or updated ATMVP. The candidate indicating the modified motion vector may replace a temporal candidate representing the motion vector of the corresponding block in the merge candidate list or the MVP candidate list. In addition, the merge candidate list or MVP candidate list may include a spatial candidate and a temporal candidate, and the candidate representing the modified motion vector may be included in the merge candidate list or the MVP candidate list as additional temporal candidates.

On the other hand, if a plurality of updated corresponding blocks are derived, the decoding apparatus can scale the motion vectors of the plurality of updated corresponding blocks based on the first time distance and the second time distance, and may derive a scaled motion vector indicating a position closest to a specific reference point of the current block among the scaled motion vectors. That is, the decoding apparatus can derive the positions indicated by the scaled motion vectors at the position of the current block, and derive the scaled motion vector at a position nearest to the specific reference point among the positions. The decoding apparatus may derive a motion vector of a specific updated corresponding block having the derived scaled motion vector and derive the modified motion vector based on the motion vector of the specific updated corresponding block. That is, the decoding apparatus can construct the merge candidate list or the MVP candidate list including candidates indicating the motion vectors of the specific updated corresponding block. Accordingly, the merge candidate list or MVP candidate list of the current block may include a candidate indicating a motion vector of the specific updated corresponding block.

Herein, the reference point may be set to an arbitrary position included in the current block or an adjacent external area. For example, the lower right sample position among the four samples positioned at the center of the current block may be set as the reference point. The coordinates of the reference point may be derived based on the above-described equation 1. Also, the difference between the positions indicated by the scaled motion vectors and the specific reference point can be derived based on Equation 2, and the position having the smallest difference can be derived as a position closest to the specific reference point.

Further, if the size of the specific area is equal to the size of the current block and the current block is divided into a plurality of sub-blocks, the motion vector of each sub-block of the current block may be derived based on the motion vector of the updated corresponding block corresponding to each sub-block among the updated corresponding blocks. That is, the decoding apparatus can construct the merge candidate list or the MVP candidate list for each sub-block including the candidate indicating the motion vector of the updated corresponding block corresponding to each sub-block. Accordingly, the merge candidate list or MVP candidate list of each sub-block may include a candidate indicating a motion vector of the updated corresponding block.

Also, the decoding apparatus may signal information indicating whether the updated corresponding block for the current block is derived through a parameter set such as a picture parameter set (PPS) unit, a sequence parameter set (SPS) unit, a video parameter set (VPS) unit and the number of candidates representing the motion vector of the updated corresponding block. In addition, the decoding apparatus may signal information indicating whether a plurality of updated corresponding blocks are derived. Also, the encoding apparatus may signal information indicating a prediction mode of the current block. The prediction mode may be merge mode or MVP mode.

Meanwhile, although not shown in FIG. 10, the decoding apparatus can derive prediction samples based on the motion vector of the current block. Also, the decoding apparatus may use the predicted sample as a reconstructed sample immediately depending on the prediction mode, or may add a residual sample to the predicted sample to generate a reconstructed sample. The decoding apparatus may derive a reconstructed picture based on the reconstructed sample.

The decoding apparatus may obtain information on the residual for the current block from the bitstream if there is a residual sample for the current block. The information on the residual may include transform coefficients relating to the residual sample. The decoding apparatus may derive the residual samples using the transform coefficients obtained from the bitstream.

According to the present invention, the motion information of the current block can be more accurately derived, thereby reducing or eliminating the amount of data for motion information of the current block and improving the overall coding efficiency.

In addition, according to the present invention, it is possible to update the corresponding block of the current block in the inter prediction of the current block, more accurately derive the motion information of the current block based on the updated motion information, through which the prediction accuracy of the current block can be improved.

In the above-described embodiment, the methods are described based on the flowchart having a series of steps or blocks. The present disclosure is not limited to the order of the above steps or blocks. Some steps or blocks may occur simultaneously or in a different order from other steps or blocks as described above. Further, those skilled in the art will understand that the steps shown in the above flowchart are not exclusive, that further steps may be included, or that one or more steps in the flowchart may be deleted without affecting the scope of the present disclosure.

The method according to the present invention described above may be implemented in software. The encoding apparatus and/or decoding apparatus according to the present invention may be included in a device that performs image processing, for example, for a TV, a computer, a smart phone, a set-top box, or a display device.

When the embodiments of the present invention are implemented in software, the above-described method may be implemented by modules (processes, functions, and so on) that perform the functions described above. Such modules may be stored in memory and executed by a processor. The memory may be internal or external to the processor, and the memory may be coupled to the processor using various well known means. The processor may comprise an application-specific integrated circuit (ASIC), other chipsets, a logic circuit and/or a data processing device. The memory may include a ROM (read-only memory), a RAM (random access memory), a flash memory, a memory card, a storage medium, and/or other storage device.

What is claimed is:

1. A decoding apparatus for a video decoding, the decoding apparatus comprising:

a memory; and at least one processor connected to the memory, the at least one processor configured to:

obtain a merge index information for a current block from a bitstream;

obtain a first motion vector of a left block adjacent to a left side of the current block, wherein the current block is divided into a plurality of current sub-blocks;

derive a plurality of collocated sub-blocks related to the current block in a current picture, wherein the plurality of collocated sub-blocks are located in a collocated picture and are derived based on the first motion vector of the left block;

derive first sub-block motion vectors of the plurality of collocated sub-blocks in the collocated picture;

construct a merge candidate list of the current block based on a merge candidate including the first sub-block motion vectors of the plurality of collocated sub-blocks;

select the merge candidate including the first sub-block motion vectors of the plurality of collocated sub-blocks from the merge candidate list based on the merge index information; and derive second sub-block motion vectors of the current sub-blocks based on the merge candidate including the first sub-block motion vectors of the plurality of collocated sub-blocks, wherein each of the second sub-block motion vectors is derived based on each of the first sub-block motion vectors.

2. An encoding apparatus for video encoding, the encoding apparatus comprising:

a memory; and at least one processor connected to the memory, the at least one processor configured to:

obtain a first motion vector of a left block adjacent to a left side of a current block, wherein the current block is divided into a plurality of current sub-blocks;

derive a plurality of collocated sub-blocks related to the current block in a current picture, wherein the plurality of collocated sub-blocks are located in a collocated picture and are derived based on the first motion vector of the left block;

derive first sub-block motion vectors of the plurality of collocated sub-blocks in the collocated picture;

construct a merge candidate list of the current block based on a merge candidate including the first sub-block motion vectors of the plurality of collocated sub-blocks;

derive second sub-block motion vectors of the current sub-blocks based on the merge candidate list;

generate a merge index information related to the merge candidate including the first sub-block motion vectors of the plurality of collocated sub-blocks; and encode video information including the merge index information, wherein each of the second sub-block motion vectors is derived based on each of the first sub-block motion vectors.

3. An apparatus for transmitting data for a video, the apparatus comprising:

at least one processor configured to obtain a bitstream for the video, wherein the bitstream is generated based on obtaining a first motion vector of a left block adjacent to a left side of a current block, wherein the current block is divided into a plurality of current sub-blocks, deriving a plurality of collocated sub-blocks related to the current block in a current picture, wherein the plurality of collocated sub-blocks are located in a collocated picture and are derived based on the first motion vector of the left block, deriving first sub-block motion vectors of the plurality of collocated sub-blocks in the collocated picture, constructing a merge candidate list of the current block based on a merge candidate including the first sub-block motion vectors of the plurality of collocated sub-blocks, deriving second sub-block motion vectors of the current sub-blocks based on the merge candidate list, generating a merge index information related to the merge candidate including the first sub-block motion vectors of the plurality of collocated sub-blocks, and encoding video information including the merge index information to output the bitstream; and a transmitter configured to transmit the data comprising the bitstream, wherein each of the second sub-block motion vectors is derived based on each of the first sub-block motion vectors.

* * * * *